United States Patent [19]

Sakakima et al.

[11] Patent Number: 5,034,273

[45] Date of Patent: Jul. 23, 1991

[54] NITROGEN-CONTAINING MAGNETIC ALLOY FILM

[75] Inventors: Hiroshi Sakakima, Hirakata; Koichi Osano, Neyagawa; Yuji Omata, Ibaraki, all of Japan

[73] Assignee: Matsushita Electric Industrial Co., Ltd., Kadoma, Japan

[21] Appl. No.: 177,766

[22] Filed: Apr. 5, 1988

[30] Foreign Application Priority Data

Apr. 10, 1987 [JP] Japan .................................. 62-89402

[51] Int. Cl.⁵ ............................................ G11B 23/00
[52] U.S. Cl. .................................... 428/336; 428/611; 428/678; 428/694; 428/900
[58] Field of Search ............... 428/694, 900, 336, 611, 428/678

[56] References Cited

U.S. PATENT DOCUMENTS

| | | | |
|---|---|---|---|
| 4,231,816 | 11/1980 | Cuomo et al. | 148/31.55 |
| 4,271,232 | 6/1981 | Heiman et al. | 428/900 |
| 4,623,408 | 11/1986 | Karamon et al. | 148/403 |
| 4,673,610 | 6/1987 | Shirahata et al. | 428/900 |
| 4,766,039 | 8/1988 | Otomo et al. | 428/900 |

FOREIGN PATENT DOCUMENTS 150049 7/1985 European Pat. Off. .
62-210607 9/1987 Japan .

OTHER PUBLICATIONS

J. A. Aboaf et al., "Fabricating Multilayer Magnetic Films", IBM Technical Disclosure Bulletin, vol. 20, No. 11B, Apr. 1978.

Primary Examiner—Paul J. Thibodeau
Attorney, Agent, or Firm—Cushman, Darby & Cushman

[57] ABSTRACT

A nitrogen-containing magnetic alloy film composed of T-M-X amorphous alloy film and (T-M-X)N nitride film, and another film having a composition represented by (T-M-X)N and being compositionally modulated (In both cases T is at least one element selected from the group of Fe, Co, Ni and Mn, M is at least one element selected from the group of Ti, Zr, Hf, Nb, Ta, Cr, Mo, W, Re and Ru, X is at least one element selected from the group of B, Si, Ge and Al, and N is nitrogen.) show excellent characteristics for magnetic head cores such as soft magnetic property and wear resistance.

2 Claims, 2 Drawing Sheets

NITROGEN-CONTAINING MAGNETIC ALLOY FILM

FIELD OF THE INVENTION AND RELATED ART STATEMENT

1. Field of the Invention

The present invention relates to a soft magnetic material suitable for a magnetic head core or the like, and particularly to a magnetic alloy film containing nitrogen.

2. Description of the Related Art

Heretofore, an effort has been undertaken to make magnetic alloy films containing nitrogen (N) by $N_2$ reactive sputtering or sputtering using a nitride target. For example, a nitride alloy film made of Fe, Co, Ni and glass-forming elements such as B, Si, Al, P and C (shown in Japanese published unexamined patent application Nos. Sho 54-94428 and 60-15261) and an iron nitride film (shown in the Journal of Applied Physics (J. Appl. Phys.) 53(11), p8332(1982)) are well known.

In case of the former, for example, in a nitride Fe-B-N made by nitrifying Fe-B alloy, perpendicular magnetic anisotropy increases, and thereby, the soft magnetic property of the Fe-B alloy is deteriorated and the coercive force Hc thereof becomes large. At the same time, a saturation magnetization $4\pi$Ms decreases with increasing N content. On the other hand, in case of Fe-N film of the latter, when the Fe-N film contains a small amount of N, the value of $4\pi$Ms increases in comparison with Fe film, but the coercive force Hc is large, and thereby the Fe-N film does not show a soft magnetic property.

OBJECT AND SUMMARY OF THE INVENTION

The present invention intends to solve the above-mentioned problems, and to provide a nitrogen-containing magnetic alloy film which has a small coercive force Hc and a desirable soft magnetic property which can not be realized by the conventional magnetic nitride alloy film.

The magnetic alloy film in accordance with the present invention is a laminated alloy film comprising:

an amorphous alloy film represented by the following formula:

$$T_a M_b X_c \tag{1}$$

and a nitride alloy film represented by the following formula:

$$(T_a M_b X_c)_{\frac{100-d}{100}} N_d \tag{2}$$

Another magnetic alloy film in accordance with the present invention is a compositionally modulated magnetic nitride alloy film represented by the following formula:

$$(T_{a'} M_{b'} X_{c'})_{\frac{100-d'}{100}} N_{d'} \tag{3}$$

whereabove,

T is at least one element selected from the group consisting of Fe, Co, Ni and Mn, M is at least one element selected from the group consisting of Ti, Zr, Hf, Nb, Ta, Cr, Mo, W, Re and Ru, X is at least one element selected from the group consisting of B, Si, Ge and Al, N is nitrogen, and suffixes a, b, c and d, and a', b', c' and d' show atomic percentages of the elements T, M, X and N, respectively and, the values of a, b, c and d are defined by the following expression:

$$\left.\begin{array}{l} 70 \leq a \leq 90, \\ 0 \leq b \leq 20, \\ c \leq 30, \\ b + c \geq 10, \\ 1 \leq d < 30 \end{array}\right\} \tag{4}$$

The values of a', b', c' and d' are defined by the following expression:

$$\left.\begin{array}{l} 70 \leq a' \leq 90, \\ 0 \leq b' \leq 20, \\ c' \leq 30, \\ b' + c' \geq 10, \\ 1 \leq d' \leq 20 \end{array}\right\} \tag{5}$$

The values of a', b', c' and d' are average values. Since each component of the film is compositionally modulated in a direction of the film thickness, in some part of the film, the composition thereof is not necessarily in a range shown by expression (5).

As described above, the magnetic films of the present invention are laminated magnetic alloy films made by laminating the alloy films represented by formulas (1) and (2), and the nitrogen-containing magnetic alloy film having compositionally modulated structure represented by expression (3). They have high wear resistance and corrosion resistance and have soft magnetic property suitable for the magnetic head core or the like.

For example, while single-layered (compositionally non-modulated) nitride film does not show soft magnetic property, the lamination of the conventional amorphous alloy film and the nitride film represented by expression (2) shows the soft magnetic property. Desirable compositions of the amorphous alloy film and the nitride film are defined by expressions (4) and (5). Reason for the definition is described as follows:

In order to obtain amorphous alloy film with the composition indicated by the expression (1) into amorphous state, the following requirement must be satisfied:

$$b + c \geq 10 \tag{6}$$

In order to accomplish sufficiently high saturation magnetization, a condition defined by the following expression is preferable:

$$c \leq 30, b \leq 20 \tag{7}$$

Since, total value of a, b and c is as follows:

$$a + b + c = 100 \tag{8},$$

range of a is defined by expressions (6) and (7) as follows:

$$70 \leq a \leq 90 \quad (9).$$

Additionally, as far as the condition defined by expression (6) is satisfied, either one of b or c may be 0. However, actually, it is desirable that c is not 0 (c≠0), since, in the condition of b=0 and c≠0, a curie temperature is low and the characteristic is improved by comparatively low temperature annealing in comparison with the condition of b≠0 and c=0.

The nitride alloy film represented by expression (2) is obtained by nitrifying the alloy film shown by the expression (1). In order to achieve stability of structure and prevent a decrease in the saturation magnetization, the following requirement must be satisfied:

$$d < 30 \quad (10).$$

In order to improve wear resistance by making nitriding, the following condition is required:

$$d \geq 1 \quad (11).$$

Though, the magnetic nitride alloy film represented by the expression (2) shows high wear resistance and corrosion resistance, it does not show such excellent soft magnetic property as the amorphous alloy shown by expression (1). However, it has been found that the laminated alloy film made by laminating the amorphous alloy film of expression (1) and the magnetic nitride alloy film of expression (2) shows the soft magnetic property, and particularly, when the following condition is satisfied, an excellent soft magnetic property is realized:

$$t < 1000 \text{ Å} \quad (12),$$

wherein t is the layer thickness of the laminated film.

Improvement of the soft magnetic property is accomplished, not only by the laminated film made of nitride film and non-nitride film, but also by compositionally modulated nitride film wherein nitrogen is compositionally modulated.

The above-mentioned laminated film, for example, can be made by a sputtering method wherein nitrogen gas is introduced periodically into the chamber during the sputtering. Moreover, for instance, the compositionally modulated film can be made by annealing the above-mentioned laminated film at a proper temperature, thereby making an interdiffusion of N and other constituent elements between layers. In such a compositionally modulated film, in general, when nitrogen (N) is compositionally modulated, other constituent elements are compositionally modulated to a certain extent, and as a result, composition in the direction of film thickness becomes non-uniform. It is preferable that average composition concerning the element groups T, M, and X is in the composition range of expression (4).

With regard to the average content of nitrogen (N), in order to realize desirable wear resistance, the following condition is required:

$$d' \geq 1 \quad (13),$$

and in order to prevent deterioration of the saturation magnetization, the following condition is required:

$$d' \leq 20 \quad (14).$$

From the above-mentioned conditions, expression (5) is obtained.

The soft magnetic property of the compositionally modulated film is improved with compositional modulation wavelength λ becoming short, and particularly, under the following condition, excellent soft magnetic property is realized, $$\lambda < 1000 \text{ Å} \quad (15).$$

DESCRIPTION OF THE PREFERRED EMBODIMENTS

In the following, examples embodying the present invention is explained.

EXAMPLE 1

$Co_{67}Mn_{12}B_{21}$ amorphous alloy film was prepared by using an RF diode sputtering apparatus wherein Co-Mn-B alloy target was sputtered at $1.1 \times 10^{-2}$ Torr of Ar gas pressure. Then, $N_2$ gas was mixed with the above-mentioned Ar gas to prepare a mixed gas of $1.2 \times 10^{-2}$ Torr of total gas pressure, and it was sputtered, thereby making a nitride alloy film. Composition of the nitride alloy film was $Co_{60}Mn_{10}B_{18}N_{12}$ by analysis. Next, a laminated film of nitride film and non-nitride film was prepared by sputtering under a condition that Ar gas partial pressure was fixed at $11 \times 10^{-2}$ Torr, and $N_2$ gas of $0.1 \times 10^{-2}$ Torr of partial pressure was periodically mixed with Ar gas. Moreover, by changing the period of the mixing $N_2$ gas, laminated films consisting of the nitride layers and the non-nitride layers having different layer thickness are made. Magnetic properties of these films were studied and compared. Results are shown in Table 1.

TABLE 1

|  | No. | Example (as prepared) | Layer thickness of respective layers (Å) | Coercive force Hc (Oe) | Saturation magnetization $4\pi M_s$ (Gauss) |
|---|---|---|---|---|---|
| Comparison | A | $Co_{67}Mn_{12}B_{21}$ | 10000 (single layer) | 0.4 | 9800 |
| Example | B | $Co_{60}Mn_{10}B_{18}N_{12}$ | 10000 (single layer) | 12.0 | 9000 |
| Example | C | $Co_{67}Mn_{12}B_{21}/Co_{60}Mn_{10}B_{18}N_{12}$ | 2000/2000 | 8.0 | 9400 |
|  | D | Same as above | 1000/1000 | 6.0 | 9400 |
|  | E | Same as above | 500/500 | 1.2 | 9400 |
|  | F | Same as above | 200/200 | 0.8 | 9400 |

TABLE 1-continued

| No. | Example (as prepared) | Layer thickness of respective layers (Å) | Coercive force Hc (Oe) | Satuation magnetization $4\pi M_s$ (Gauss) |
|---|---|---|---|---|
| G | Same as above | 100/100 | 0.4 | 9400 |

As shown in Table 1, when t (layer thickness of one layer) is under 1000 Å, the coercive force Hc of the laminated film is remarkably small and the film has excellent soft magnetic property; and when t is above 1000 Å, the soft magnetic properties are deteriorated. On the other hand, conventional single layered nitride film does not show soft magnetic property regardless of the film thickness. Moreover, the saturation magnetization $4\pi Ms$ of the laminated film is of a medium value between those of the non-nitride film and nitride film.

Figure 1:
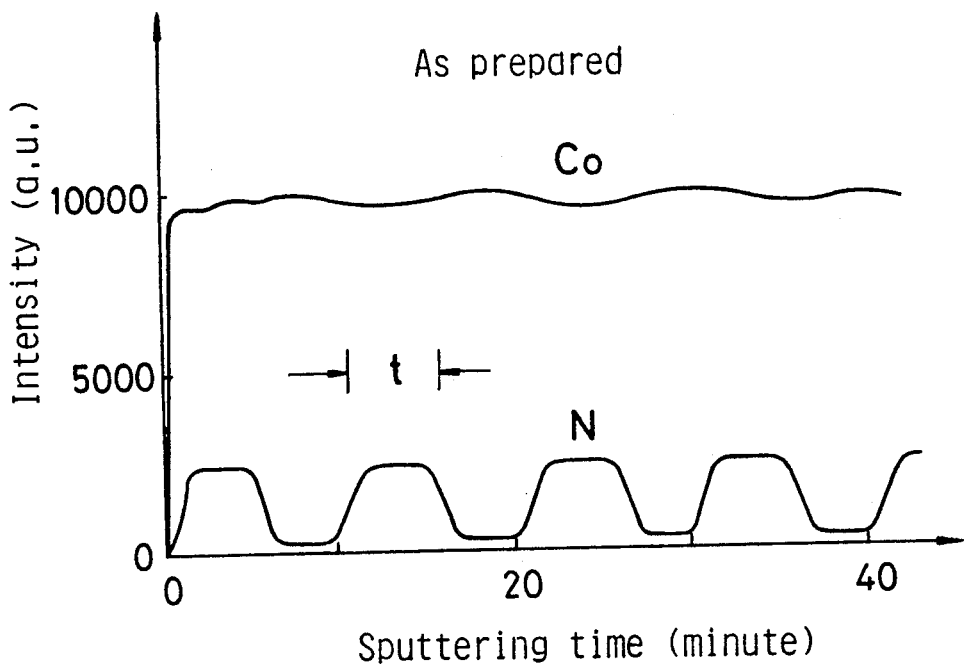
FIG. 1a and FIG. 1b are diagrams showing the depth profile of Co and N of a laminated magnetic alloy film and a compositionally modulated magnetic alloy film of the present invention measured by Auger electron spectroscopy (AES).
Figure 1:
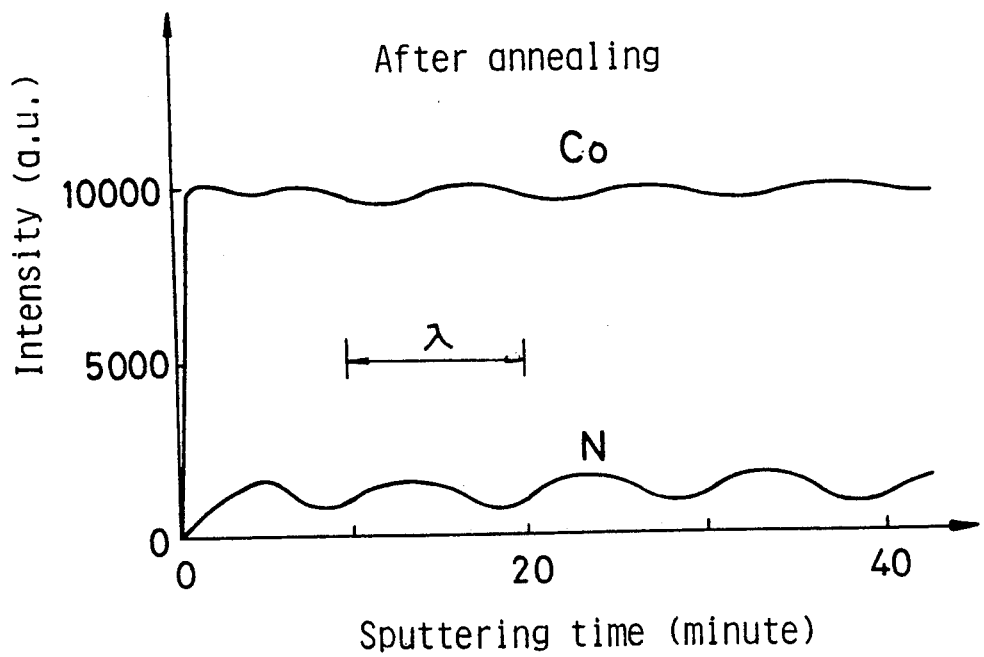

Then, these films were annealed for 10 minutes at 400° C. The magnetic properties of them are shown in Table 2. FIG. 1a shows a depth profile (measured by AES) of Co and N of sample F (before annealing). FIG. 1b shows the depth profile of Co and N of sample F' (after annealing). As is clearly shown by the depth profiles of FIG. 1a and 1b, it is proved that the laminated film which has multi-layered structure at prepared state becomes compositionally modulated film by interdiffusion of N element between the layers caused by the annealing. Compositional modulation wavelength λ is shown in Table 2. As shown in Table 2, even when the laminated-structure film is made into the compositionally modulated film, the soft magnetic property does not disappear. The shorter the compositional modulation wavelength λ becomes, the smaller the coercive force Hc becomes; and particularly, when λ is below 2000 Å, excellent soft magnetic property is realized. Annealed compositionally modulated film having small λ shows a tendency that the saturation magnetization $4\pi Ms$ is considerably larger than the average value of the laminated film consisting of the nitride film and non-nitride film.

TABLE 2

| | No. | Example (After annealing) | Compositional modulation wave length λ (Å) | Coercive force Hc (Oe) | Satuation magnetization $4\pi M_s$ (Gauss) |
|---|---|---|---|---|---|
| Comparison example | A' | $Co_{67}Mn_{12}B_{21}$ | — | 0.2 | 9800 |
| | B' | $Co_{60}Mn_{10}B_{18}N_{12}$ | — | 12.0 | 9000 |
| Example of the present invention | C' | $Co_{63.5}Mn_{11}B_{19.5}N_6$ (Average composition) | about 4000 | 4.0 | 9400 |
| | D' | Same as above | about 2000 | 4.0 | 9400 |
| | E' | Same as above | about 1000 | 1.0 | 9400 |
| | F' | Same as above | about 400 | 0.4 | 9500 |
| | G' | Same as above | about 200 | 0.4 | 9500 |

EXAMPLE 2

By the same method as Example 1, nitride films and non-nitride films having 40 μm thickness were prepared by using a target of $Co_{71}Fe_5Si_{12}B_{12}$ and changing $N_2$ partial pressure ratio η. The ratio η is defined by the following expression:

$$\eta = \frac{N_2 \text{ gas partial pressure}}{(Ar + N_2) \text{ gas pressure}} \times 100 \, [\%]. \quad (16)$$

Then, laminated films of these nitride layers and non-nitride layers, wherein each layer has about 200 Å layer thickness t, were made by periodically changing η.

Moreover, resultant laminated films were annealed for 10 minutes at 450° C. thereby obtaining compositionally modulated films. Magnetic property and wear resistance of those resultant films were shown in Table 3.

TABLE 3

| | η (%) | t (Å) | λ (Å) | Hc (Oe) | $4\pi M_s$ (Gauss) | Partial wear amount Δ 1(Å) | Corrosion resistance | |
|---|---|---|---|---|---|---|---|---|
| H | 0 | | | 0.1 | 9000 | about 600 | × | single |
| I | 5 | | | 2 | 9100 | about 400 | Δ | layered |
| J | 1 | | | 4 | 9100 | about 150 | ○ | film |
| K | 2 | | | 6 | 9000 | about 100 | ⊙ | |
| L | 5 | | | 8 | 8800 | about 50 | ⊙ | |
| M | 10 | | | 12 | 8500 | almost 0 | ⊙ | |
| N | 20 | | | 16 | 8000 | almost 0 | ⊙ | |
| O | 30 | | | Exfoliated from substrate (not measurable) | | | | |
| P | 2/0 | about 200 | | 0.2 | 9000 | about 150 | Δ | Laminated |
| Q | 5/0 | about 200 | | 0.3 | 9000 | about 150 | ○ | film |
| R | 10/0 | about 200 | | 0.3 | 8800 | about 100 | ○ | |
| S | 20/0 | about 200 | | 0.5 | 8600 | almost 0 | ○ | |
| P' | $\overline{1}$ | | about 400 | 0.3 | 9100 | about 100 | ○ | Compositionally |
| Q' | $\overline{2.5}$ | | about 400 | 0.3 | 9100 | about 50 | ⊙ | modulated film |
| R' | $\overline{5}$ | | about 400 | 0.3 | 8900 | about 50 | ⊙ | |
| S' | $\overline{10}$ | | about 400 | 0.5 | 8700 | almost 0 | ⊙ | |
| T | $\overline{20}$ | | about 400 | 0.6 | 8500 | almost 0 | ⊙ | |

Figure 2:
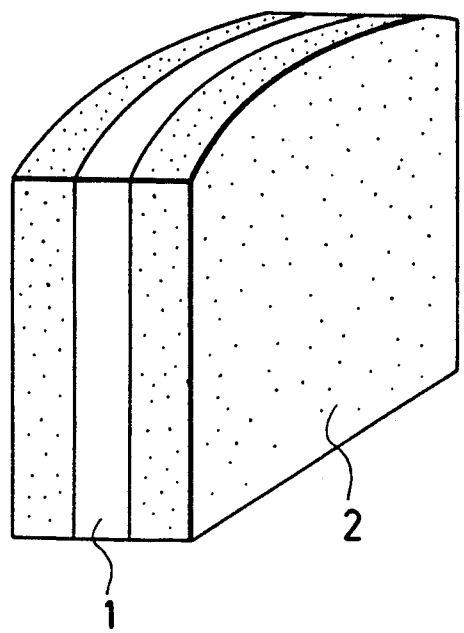
FIG. 2a is a perspective view of a dummy head chip for a wear resistance test.
FIG. 2b is a sectional view showing a measuring method of partial wear amount (Δ1) of the dummy head after tape running for 500 hours.
Figure 2:
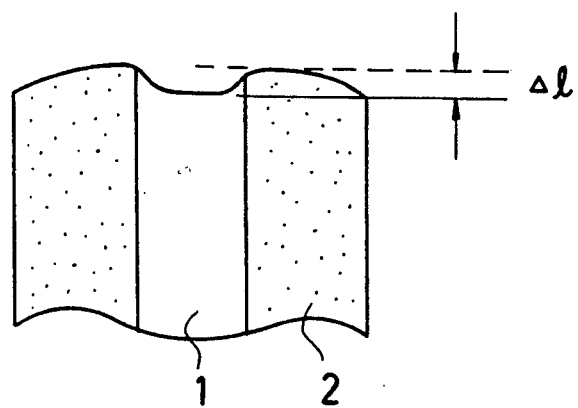

In Table 3, η of compositionally modulated film is shown in average value. A bar (—) is put above figure of value of η. Additionally, partial wear amount was measured as follows:

As shown in FIG. 2a, the alloy film 1 was sandwiched by substrates, and it was worked into head-chip shape, and was mounted on a VTR deck. After 500 hours of tape running time, the partial wear amount Δ1 shown in FIG. 2b was measured.

Corrosion resistance was evaluated by dipping each sample by half in water for 24 Hr and observing the degree of color change the boundary part. When no change of color was observed, the corrosion resistance was evaluated as ⊙. When the observed change of color was not substantial, it was evaluated as ○. When a slight change of color was observed, it was evaluated as Δ. When change of color was clearly observed, it was evaluated as ×.

Sample O was prepared under a condition of η=30 exfoliated from the substrate 2. The reason for this seems to be that strain is accumulated in the film. Therefore, its characteristics could not be measured. On the other hand, no exfoliation occured in sample T, which is compositionally modulated film prepared by annealing the laminated film thereby to make λ about 400 Å.

From Table 3, it is proved that for the laminated film when η is larger than 1 (%), and for the compositionally modulated film when η is larger than 1 (%), the wear resistance and the corrosion resistance are improved. Moreover, in order to prevent remarkable decrease of the saturation magnetization and exfoliation of the alloy film, it is desirable that η is below 30% (for the laminated film) and η is below 20% (for the compositionally modulated film).

EXAMPLE 3

Single layered amorphous alloy films, single layered nitride alloy films, laminated alloy films and compositionally modulated nitride alloy films were prepared by using various kind of alloy targets, in the same manner as that of examples 1 and 2. Characteristics of these films are shown in Table 4.

magnetic characteristics and is also superior to simple (single layered) amorphous alloy film in the corrosion resistance and the wear resistance. Therefore, it has more desirable characteristics for the magnetic head material or the like.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A nitrogen-containing magnetic alloy film on a substrate represented by the following formula:

$$(T_a, M_b, X_c)_{\frac{100-d}{100}}, N_{d'}$$

wherein

T is at least one element selected from the group consisting of Fe, Co, Ni and Mn, M is at least one element selected from the group consisting of Ti, Zr, Hf, Nb, Ta, Cr, Mo, W, Re and Ru, X is at least one element selected from the group consisting of B, Si, Ge and Al, N is nitrogen, and suffixes a', b', c' and d' show average atomic percentages of the elements T, M, X and N respectively, and said values of a', b', c' and d' are defined by the following expressions:

$$70 \leq a' \leq 90,$$

TABLE 4

| Composition of target | η (%) | t or λ (Å) | Hc (Oe) | 4π M_s (Gauss) | Partial wear amount Δ 1(Å) | Corrosion resistance |
|---|---|---|---|---|---|---|
| Fe_78Nb_10B_12 | 0 | single layer | 1 | 13000 | about 300 | ○ |
| " | 5 | " | 18 | 12000 | almost 0 | ⊙ |
| " | 5/0 | t ≈ 200 | 2 | 12000 | about 50 | ○ |
| " | 2.5 | λ ≈ 400 | 1 | 13000 | almost 0 | ⊙ |
| Co_72Fe_4Mn_2Si_11B_11 | 0 | single layer | 0.1 | 10000 | about 600 | × |
| " | 10 | " | 12 | 9500 | about 50 | ⊙ |
| " | 10/0 | t ≈ 100 | 0.2 | 10000 | about 100 | ○ |
| " | 5 | λ ≈ 200 | 0.3 | 10000 | about 50 | ⊙ |
| Fe_60Ni_25Zr_10Si_5 | 0 | single layer | 2 | 11000 | about 400 | × |
| " | 5 | " | 20 | 10000 | almost 0 | ○ |
| " | 5/0 | t ≈ 200 | 2 | 10000 | about 50 | Δ |
| " | 2.5 | λ ≈ 400 | 4 | 11000 | almost 0 | ○ |
| Fe_68Co_17Zr_10Al_5 | 0 | single layer | 3 | 14000 | about 300 | × |
| " | 10 | " | 22 | 13000 | almost 0 | ○ |
| " | 10/0 | t ≈ 200 | 3 | 13000 | about 50 | Δ |
| " | 5 | λ ≈ 400 | 5 | 14000 | almost 0 | ○ |
| Co_80Fe_5Ti_5B_15 | 0 | single layer | 0.2 | 11000 | about 500 | Δ |
| " | 10 | " | 12 | 10500 | almost 0 | ⊙ |
| " | 0/10 | t ≈ 150 | 0.3 | 10500 | about 100 | ○ |
| " | 5 | λ ≈ 300 | 0.3 | 11000 | almost 0 | ⊙ |
| Co_80Fe_5Ta_5B_15 | 0 | single layer | 0.2 | 11000 | about 400 | Δ |
| " | 10 | " | 12 | 9500 | almost 0 | ⊙ |
| " | 0/10 | t ≈ 150 | 0.2 | 9500 | about 100 | ○ |
| " | 5 | λ ≈ 300 | 0.3 | 10000 | almost 0 | ⊙ |
| Co_80Fe_5Mo_5B_15 | 0 | single layer | 0.1 | 10000 | about 500 | × |
| " | 10 | " | 10 | 9500 | almost 0 | ⊙ |
| " | 0/10 | t ≈ 150 | 0.2 | 9500 | about 100 | Δ |
| " | 5 | λ ≈ 300 | 0.2 | 10000 | almost 0 | ⊙ |
| Co_80Fe_5W_5B_15 | 0 | single layer | 0.1 | 9500 | about 400 | × |
| " | 10 | " | 10 | 9000 | almost 0 | ⊙ |
| " | 0/10 | t ≈ 150 | 0.2 | 9000 | about 100 | Δ |
| " | 5 | λ ≈ 300 | 0.2 | 9500 | almost 0 | ⊙ |

As mentioned above, the nitrogen-containing magnetic alloy film of the present invention is superior to simple (single layered) magnetic nitride alloy film in the $0 \leq b' \leq 20$, $c' \leq 30$, $b' + c \geq 10$, $1 \leq d' < 20$, and wherein at least nitrogen (N) and at least one element selected from the group consisting of T, M and X in said nitrogen-containing magnetic alloy film are compositionally modulated in a direction of film thickness.

2. A nitrogen-containing magnetic alloy film according to claim 1, wherein said compositional modulation of said film, defined by wavelength $\lambda$, is below 2000 Å.

* * * * *